UNITED STATES PATENT OFFICE.

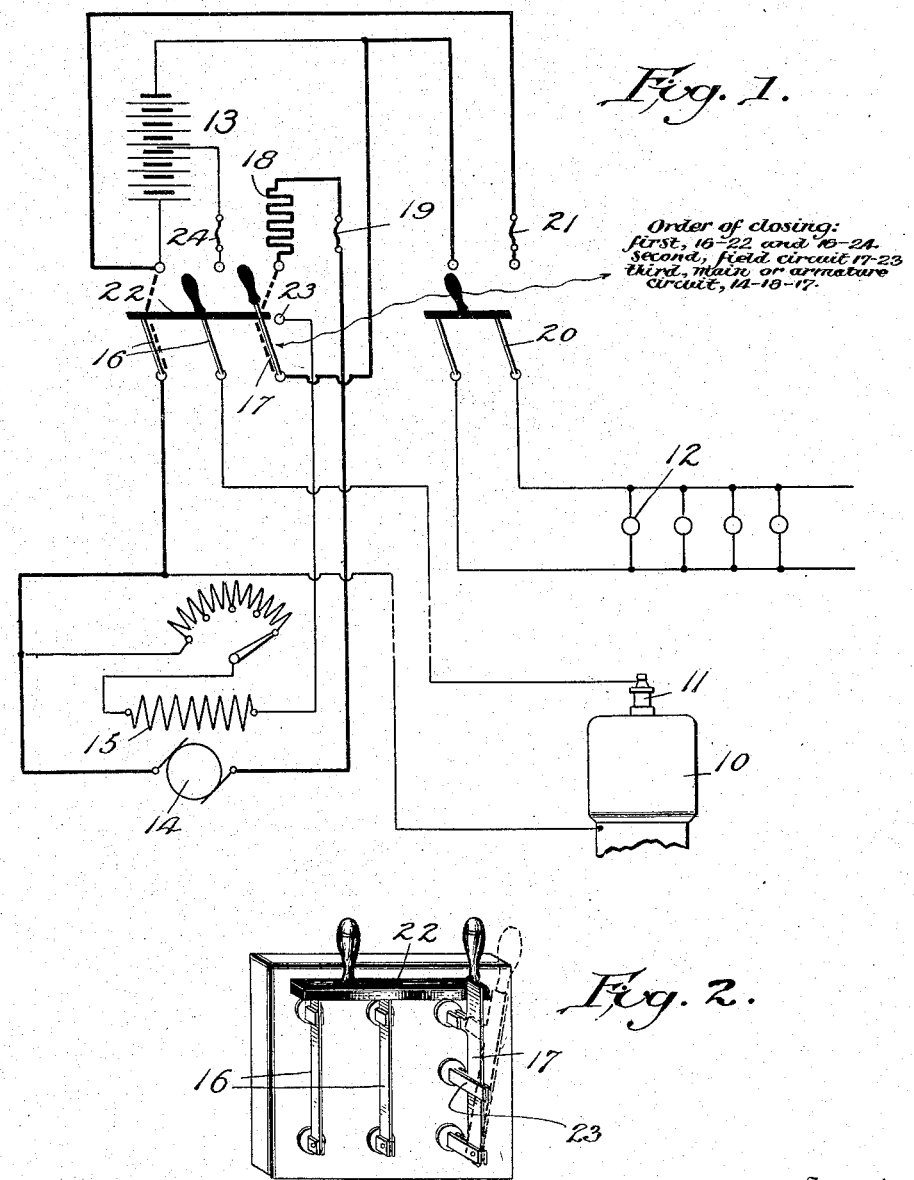

STATES LEE LEBBY, OF CHARLESTON, SOUTH CAROLINA.

IGNITION AND CHARGING SYSTEM.

1,174,742.   Specification of Letters Patent.   Patented Mar. 7, 1916.

Application filed June 3, 1914. Serial No. 842,755.

*To all whom it may concern:*

Be it known that I, STATES LEE LEBBY, a citizen of the United States, residing at Charleston, county of Charleston, State of South Carolina, have invented certain new and useful Improvements in Ignition and Charging Systems, of which the following is a specification, reference being had therein to the accompanying drawing.

My invention relates to ignition and lighting systems for vehicles, motor boats, railway cars, and the like, and consists of improvements in the system described and claimed in my Patent No. 1,044,399 granted November 12, 1912. In said system a storage battery is charged from a direct current generator having a permanent magnetic field and driven by a prime mover. Both lighting and ignition circuits are fed from this battery. The ignition circuit and the charging circuit are provided with seprate but mechanically interlocking switches, so arranged that when the ignition circuit is opened the charging circuit is also opened, and the charging circuit cannot be closed before the ignition circuit is closed. By this means the generator is not connected with the battery until the prime mover has been started, and short-circuiting of the battery through the generator while the generator is idle is impossible. It is possible, however, in the patented system, to first close the ignition circuit and then after the prime mover has been started, close the charging circuit. Since the generator is provided with a permanent field there is always excitation sufficient for the generator to produce an opposing voltage when operated from the prime mover.

In the system of my present invention, a separately excited field is provided, adapting the system for use in units of large size. This field is connected for excitation from the storage battery, and is so associated with the charging and ignition circuit switches that the field circuit is closed and the field thereby excited before the generator charging circuit is closed. I have also arranged the circuits so that the proper voltage may be employed for igniting.

In the accompanying drawings I show one embodiment of my invention.

Figure 1 is a diagrammatic illustration of the system as a whole, and Fig. 2 is a perspective view of the charging and ignition switches as mounted upon their panel.

The various elements of the system are characterized as follows, identification thereof being by means of the reference numerals by which they are designated upon the drawings:

(10) The prime mover. A portion of one cylinder of a reciprocating internal combustion engine is here indicated. It is of course understood that the system may be associated with a multiple cylinder engine, or a motor of any other type.

(11) A sparking device such as the ignition plug commonly used, and which may or may not include an induction coil in its own structure. Instead of a high tension plug, this may be a low tension sparking device, or a sparking device of any other type which may be supplied with energy from an electrical source. The usual spark coil may be insulated at any point in the circuit of device (11).

(12) The electric lights.

(13) The storage battery from which the sparking device (11) and the lights (12) are fed. This storage battery may be of any approved type.

(14) The generator from which the storage battery (13) is charged, and which is normally driven from the prime mover. Under special conditions it may be driven by hand or from any suitable source of power as is well understood in the art.

(15) The field winding of the generator (14). As shown this is a shunt winding. If my invention is embodied in certain other systems, this winding may be series. In series with it is an ordinary field rheostat as indicated.

(16) A double pole single throw switch by means of which one pole of generator (14) and the sparking device (11) may be connected with the battery through the conductors shown. This pole of the generator (14) is common also to the sparking device (11) being connected with the grounded side thereof. It is connected by switch (16) with one terminal of the battery (13). The other terminal of the sparking device (11) is connected by switch (16) approximately centrally of the battery (13), whereby the sparking device (11) receives approximately one-half of the full voltage of the battery.

(17) A single pole single throw switch by means of which the remaining terminal of generator (14) may be connected with the opposite terminal of battery (13).

(18) A current limiting resistance of iron wire or other suitable material through which the aforesaid connection is effected.

(19) A current limiting fuse or other overload circuit breaking device in series with said resistance (18).

(20) The control switch of the lighting circuit.

(21) A fuse or other device limiting the current flow in the lighting circuit.

(22) An extension of insulating material from switch (16) which underlies the blade of switch (17) and constitutes the interlock of my prior patent referred to. The detail of this is clearly shown in Fig. 2. Any other form of interlock may of course be substituted for this.

(23) The control terminal of the circuit of generator field (15). This is located intermediate the other two terminals of charging switch (17) and as clearly shown in Fig. 2 is considerably higher, whereby the circuit of the generator field (15) is closed before the charging circuit to the armature. This is clearly shown by the dotted line position of the switch in Fig. 2. In order to effect this and yet permit the interlocking extension (22) to be an extension of the usual bridge bar of the double pole switch, the lower terminal of switch (17) is also made higher than the upper and the switch blade is provided with a front extension or prong coöperating with the upper contacts, whereby the blade of switch (17) lies when closed parallel to but above the blades of switch (16).

(24) A fuse or other overload circuit breaking device in the circuit of the sparking device (11).

The operation is as follows: In starting, the prime mover switch (16) should be closed first, thus placing battery upon the sparking device (11), whereupon the prime mover (10) may be started. If a mistake should be made and it be attempted to close first the switch (17), opposition will be encountered owing to the interlock between the two switches (16) and (17). Switch (16) having been properly closed first, switch (17) may then be closed without danger of damage to the battery or to the generator or even of imposing a temporary overload upon the generator. In closing it the circuit of the exciting field (15) is closed and the field excited through engagement of the switch blade with terminal (23) before the charging circuit to the armature is closed through resistance (18). Thereby, the prime mover (10) having been started, the instant the charging circuit is closed, generator voltage is impressed upon the battery. Moreover this voltage is, owing to the excitation of field (15) from the battery, exactly proportional to the voltage of the battery and therefore precisely the proper voltage to be applied thereto for charging. It is of course assumed that the speed of the prime mover is adjusted between proper limits but even in case the speed should vary from proper limits, it is impossible under these circumstances to impress a damaging voltage upon the battery. Under these conditions, operation may be continued indefinitely. At any time desired, the lights (12) may be lighted by simply closing the switch (20).

When it is desired to stop the prime mover (10), the ignition switch (16) is thrown open and simultaneously by reason of the interlock (22), the charging circuit is opened at switch (17). If while stopped the ignition and charging switches should be both closed without starting the prime mover (10), resistance (18) will limit the current flow from battery (13) through generator (14) to a maximum which will not damage the battery though it will result in complete discharge of the battery in time. Due to the fact that the generator field is excited from the storage battery, I not only get an instant adjustment of charge current to battery, but I also get an instantly excited field without dependence on residual magnetism, a properly polarized field, and being a constant field I get no excessive charge rate from increase in field, due to increase in speed or racing of prime mover, a feature of radical improvement over all other similar systems within my knowledge.

I am aware that a number of changes, both mechanical and electrical, may be made in the embodiment of my invention thus described. I wish it understood that I contemplate and include herein all such changes and modifications as fairly fall within the scope of the appended claims, specific language being employed herein for purposes of definition and not of limitation.

Having thus described my invention what I claim and desire to secure by Letters Patent is—

1. In a system of the class described, a storage battery, a charging dynamo therefor having an exciting field winding, a prime mover for the dynamo, an electric circuit controlling the starting and running of said prime mover supplied with current from the storage battery, a charging circuit extending from said dynamo, a field circuit connected to its field winding, and switching apparatus comprising the following instrumentalities: an element controlling the circuit of the prime mover; an element adapted to connect the field circuit to the storage battery, and an element thereafter adapted to connect the charging circuit from the dynamo to the storage battery.

2. In a system of the class described, a storage battery, a charging dynamo therefor having an exciting field winding, a prime mover for the dynamo, an electric circuit controlling the starting and running of said prime mover supplied with current from the storage battery, a charging circuit extending from said dynamo, a field circuit connected to its field winding, and switching apparatus comprising the following instrumentalities: an element controlling the circuit of the prime mover, a switch element connected to the storage battery, and two coöperating elements, one connected to the field circuit of the dynamo and the other to the charging circuit therefrom, these elements adapted to be closed together in operation in the order named, whereby the field circuit will also be properly excited before the charging circuit is closed.

3. In a system of the class described, a storage battery, a charging dynamo therefor having an exciting field winding, a prime mover for the dynamo, an electric circuit controlling the starting and running of said prime mover supplied with current from the storage battery, a charging circuit extending from said dynamo, a field circuit connected to its field winding, and switching apparatus comprising the following instrumentalities: an element controlling the circuit of the prime mover, a knife switch having three terminals, one a movable terminal or blade, and two coöperating fixed terminals adapted to be closed on the first terminal successively, one of said terminals connected to the field circuit and the other to the charging circuit, the shape and proportions of the elements being such that the field circuit terminal must be closed before the charging circuit terminal is reached.

4. In a system of the class described, a storage battery, a charging dynamo therefor having an exciting field winding, a prime mover for the dynamo, an electric circuit controlling the starting and running of said prime mover supplied with current from the storage battery, a charging circuit extending from said dynamo, a field circuit connected to its field winding, and switching apparatus comprising the following instrumentalities: an element controlling the circuit of the prime mover, a knife blade switch having its blade connected to the storage battery, and two coöperating terminal clips one longer than the other and thereby making contact with the blade before the other, said long clip being connected to the field circuit of the dynamo and the short clip to the charging circuit therefrom.

5. In a system of the class described, a storage battery, a charging dynamo therefor having an exciting field winding, a charging circuit extending from said dynamo, a field circuit connected to its field winding, a prime mover for said dynamo, an electric circuit controlling the starting and running of said prime mover supplied with current from the dynamo storage battery, and switching apparatus for the several circuits comprising the following instrumentalities: switching elements for the field and charging circuits from the dynamo, and a separate switching element controlling the circuit to the prime mover, together with connections such that the prime mover circuit must first be closed before the field and charging circuits of the dynamo can be closed.

6. In a system of the class described, a storage battery, a charging dynamo therefor having an exciting field winding, a charging circuit extending from said dynamo, a field circuit connected to its field winding, a prime mover for said dynamo, an electric circuit controlling the starting and running of said prime mover supplied with current from the dynamo storage battery, and switching apparatus for the several circuits comprising the following instrumentalities: switching elements for the field and charging circuits from the dynamo, and a separate switching element controlling the circuit to the prime mover, together with connections such that the prime mover circuit must first be closed before the field and charging circuits of the dynamo can be closed, said means also operating when the prime mover circuit is opened to automatically open all the circuits to the dynamo.

7. In a system of the class described, a storage battery, a charging dynamo having an exciting field winding, a charging circuit extending from said dynamo, a field circuit connected to the field winding, a prime mover for said dynamo, an electric circuit controlling the starting and running of said prime mover supplied with current from the dynamo and storage battery, and switching apparatus for the several circuits comprising the following instrumentalities: switching elements for the field and charging circuits from the dynamo, and a separate switching element controlling the circuit to the prime mover, together with connections such that the prime mover circuit must first be closed before the field and charging circuits of the dynamo can be closed, the switching connections of the field and charging circuits being so arranged that in closing the several circuits, the field circuit of the dynamo must be closed before the charging circuit can be closed.

8. In a system of the class described, a storage battery, a charging dynamo therefor having an exciting field winding, a charging circuit extending from said dynamo, a field circuit connected to its field winding, a prime mover for the dynamo, a controlling circuit for said prime mover adapted to receive current from the dynamo, lighting means, a circuit for said lighting means, and switching apparatus comprising the following instrumentalities: first, switching elements adapted to close the controlling circuit for the prime mover; second, separate elements adapted to close the dynamo field and charging circuit; and third, other separate elements adapted to close the lighting circuit on the terminals of the storage battery; said second elements being arranged so that they can only be closed when the controlling circuit of the prime mover is closed.

9. In a system of the class described, a storage battery, a charging dynamo therefor having an exciting field winding, a charging circuit extending from said dynamo, a field circuit connected to its field winding, a prime mover for the dynamo, a controlling circuit for said prime mover adapted to receive current from the dynamo, lighting means, a circuit for said lighting means, and switching apparatus comprising the following instrumentalities: first, switching elements adapted to close the controlling circuit for the prime mover; second, separate elements adapted to close the dynamo field and charging circuit, and third, other separate elements adapted to close the lighting circuit on the terminals of the storage battery; said second elements being arranged so that they can only be closed when the controlling circuit of the prime mover is closed, and also arranged so that the field circuit of the dynamo will automatically be closed before the charging circuit, whereby first the battery can never discharge through the dynamo, the latter being always properly excited before the charging circuit is closed, second the charging and field circuits can never be closed except when the prime mover circuit is closed to properly drive the dynamo, and third, the lighting load will be carried by the battery under normal conditions with all of the dynamo circuits disconnected, and when the latter are connected and the prime mover properly operated, the lighting load will be carried by the dynamo with the battery floated on the circuit for charging.

In testimony whereof I affix my signature in presence of two witnesses.

STATES LEE LEBBY.

Witnesses:
H. STEVENS WHITE,
A. D. WALL.

Copies of this patent may be obtained for five cents each, by addressing the "Commissioner of Patents, Washington, D. C."